(12) United States Patent
Schloming

(10) Patent No.: US 8,812,711 B2
(45) Date of Patent: Aug. 19, 2014

(54) THREE-WAY COMMUNICATION PROTOCOL

(75) Inventor: Rafael H. Schloming, Arlington, MA (US)

(73) Assignee: Red Hat, Inc., Raleigh, NC (US)

( * ) Notice: Subject to any disclaimer, the term of this patent is extended or adjusted under 35 U.S.C. 154(b) by 724 days.

(21) Appl. No.: 12/072,895

(22) Filed: Feb. 27, 2008

(65) Prior Publication Data
US 2009/0216901 A1    Aug. 27, 2009

(51) Int. Cl.
*G06F 15/16* (2006.01)
(52) U.S. Cl.
USPC ........... 709/231; 709/237; 709/201; 370/392; 370/400; 726/3
(58) Field of Classification Search
USPC .......... 709/231, 237, 201; 370/236, 394, 392, 370/400; 726/3
See application file for complete search history.

(56) References Cited

U.S. PATENT DOCUMENTS

| | | | | |
|---|---|---|---|---|
| 7,626,971 B2 * | 12/2009 | Noma | | 370/342 |
| 2002/0105939 A1 * | 8/2002 | Vassilovski et al. | | 370/349 |
| 2002/0163912 A1 * | 11/2002 | Carlson | | 370/392 |
| 2004/0006732 A1 * | 1/2004 | Lundby | | 714/748 |
| 2004/0008681 A1 * | 1/2004 | Govindarajan et al. | | 370/394 |
| 2004/0190455 A1 * | 9/2004 | Hashimoto | | 370/238 |
| 2004/0205770 A1 * | 10/2004 | Zhang et al. | | 719/313 |
| 2004/0254977 A1 * | 12/2004 | Zhang | | 709/201 |
| 2005/0243059 A1 * | 11/2005 | Morris et al. | | 345/158 |
| 2005/0250445 A1 * | 11/2005 | Hansson | | 455/41.2 |
| 2006/0206558 A1 * | 9/2006 | Cohen et al. | | 709/201 |
| 2007/0025374 A1 * | 2/2007 | Stefan et al. | | 370/401 |
| 2007/0116030 A1 * | 5/2007 | Lundby | | 370/442 |
| 2007/0300290 A1 * | 12/2007 | Shay et al. | | 726/3 |
| 2008/0123686 A1 * | 5/2008 | Lee et al. | | 370/466 |
| 2008/0130534 A1 * | 6/2008 | Tomioka | | 370/310 |
| 2008/0232254 A1 * | 9/2008 | Chhaya et al. | | 370/236 |
| 2008/0304493 A1 * | 12/2008 | Marr et al. | | 370/400 |
| 2009/0133039 A1 * | 5/2009 | Chkodrov et al. | | 719/314 |

OTHER PUBLICATIONS

Rafael H. Schloming, "Reliability". Oct. 19, 2007. 22 pages.

* cited by examiner

*Primary Examiner* — Thuong Nguyen
(74) *Attorney, Agent, or Firm* — Lowenstein Sandler LLP

(57) ABSTRACT

Some embodiments of a three-way communication protocol have been presented. In one embodiment, a message receiver receives a message from a message transmitter. The message may include an idempotent identification (ID). The message receiver records the idempotent ID, and sends a first acknowledgement of the message to the message transmitter in response to receipt of the message. In response to receipt of a second acknowledgement from the message transmitter acknowledging the message transmitter's receipt of the first acknowledgement, the message receiver discards the idempotent ID.

16 Claims, 7 Drawing Sheets

THREE-WAY COMMUNICATION PROTOCOL

TECHNICAL FIELD

Embodiments of the present invention relate to communication, and more specifically to providing a three-way communication protocol between a message transmitter and a message receiver.

BACKGROUND

Today, electronic communication has wide spread applications that are extremely important in everyday life. One important aspect of communication is reliability in message transfer. Furthermore, it is useful to be able to determine which messages have been lost in the event of a failure in a communication component or a system. Generally speaking, components (e.g., communication devices and links) may not be completely reliable, and thus, failure of one or more components may occur from time to time. Therefore, some conventional communication protocols have been developed to enhance or to improve the reliability of communication.

FIG. 1 illustrates one conventional way to communicate between a message transmitter 101 and a message receiver 102 according to one of the conventional communication protocols. In one example, the message transmitter 101 sends a message 110 to the message receiver 102 over a communication link. Upon successful receipt of the message 110, the message receiver 102 sends an acknowledgement 120 to the message transmitter 101 to acknowledge receipt of the message 110.

When the message transmitter 101 receives the acknowledgement 120, the message transmitter 101 is assured of the successful receipt of the message 110 by the message receiver 102. Therefore, the window between the message transmitter 101 sending the message 110 and the message transmitter 101 receiving the acknowledgement 120 is sometimes referred to as an in-doubt window 115, during which the message 110 may be lost for various reasons (e.g., communication link failure, corruption of the message 110, failure in the message receiver 102, etc.).

Because it is possible that the message 110 may be lost during the in-doubt window 115, the message transmitter 101 periodically sends duplicates of the message 110 to the message receiver 102 during the in-doubt window 115 (i.e., until the message transmitter 101 receives the acknowledgement 120 from the message receiver 102). Thus, it is possible for the message receiver 102 to receive one or more duplicates of the message 110. Further, the message receiver 102 cannot ascertain when the possibility of receiving duplicates of the message 110 will end because there is no mechanism to inform or assure the message receiver 102 that the message transmitter 101 has stopped sending duplicates of the message 110. As such, the window 125 in which the message receiver 102 may receive duplicates of the message 110 begins when the message receiver 102 receives the message 110 and goes on indefinitely. Such uncertainty adversely impacts the reliability of the overall communication between the message transmitter 101 and the message receiver 102. According to some conventional approaches, identifications are added to the message 110 and the acknowledgement 120 to detect duplicates, which are discarded. However, the conventional two-way protocol discussed above, nevertheless, provides only a probabilistic detection scheme, without any guarantee on detection of duplicate messages.

DESCRIPTION OF THE DRAWINGS

The present invention is illustrated by way of example, and not by way of limitation, in the figures of the accompanying drawings and in which.

DETAILED DESCRIPTION

Figure 1:
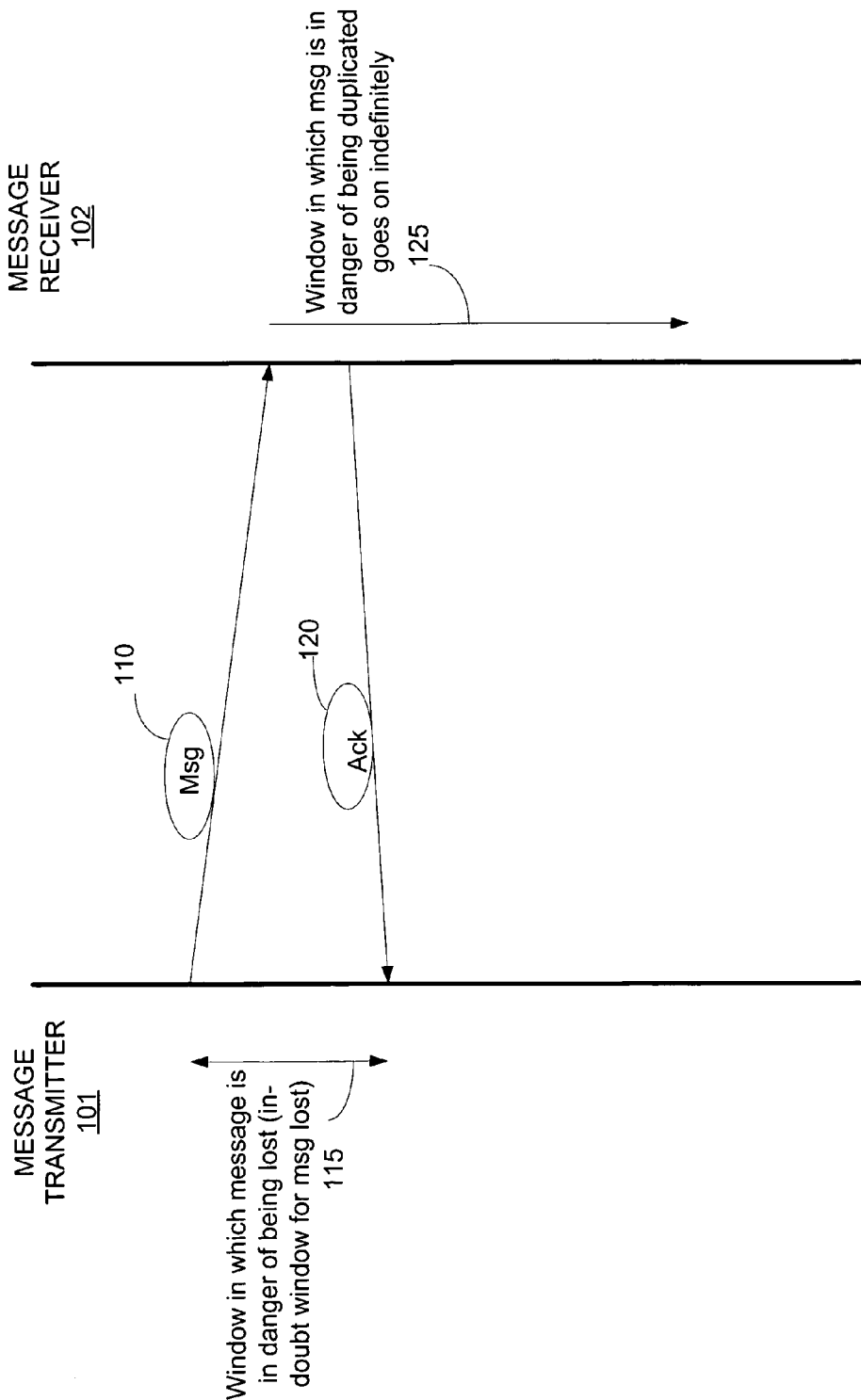
FIG. 1 illustrates one conventional way to communicate between a message transmitter and a message receiver.

Described herein are some embodiments of a three-way communication protocol. Generally speaking, a three-way communication protocol provides a scheme to ascertain the successful transmission of a message and an acknowledgement of the message. In one embodiment, a message receiver receives a message from a message transmitter. The message may include an idempotent identification (ID). The message receiver records the idempotent ID, and sends a first acknowledgement of the message to the message transmitter in response to receipt of the message. In response to receipt of a second acknowledgement from the message transmitter acknowledging the message transmitter's receipt of the first acknowledgement, the message receiver discards the idempotent ID. In some embodiments, a mechanism is included to correlate the acknowledgements to the messages being acknowledged. For example, an identification (ID) of the message may be included in the first acknowledgement and the second acknowledgment. Alternatively, correlation based on a sequential ID as discussed in details below may be used. More details of some embodiments of the three-way communication protocol are described below.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required operations. The required structure for a variety of these systems will appear from the description below. In addition, the present invention is not described with reference to any particular programming language. It will be appreciated that a variety of programming languages may be used to implement the teachings of the invention as described herein.

Figure 2A:
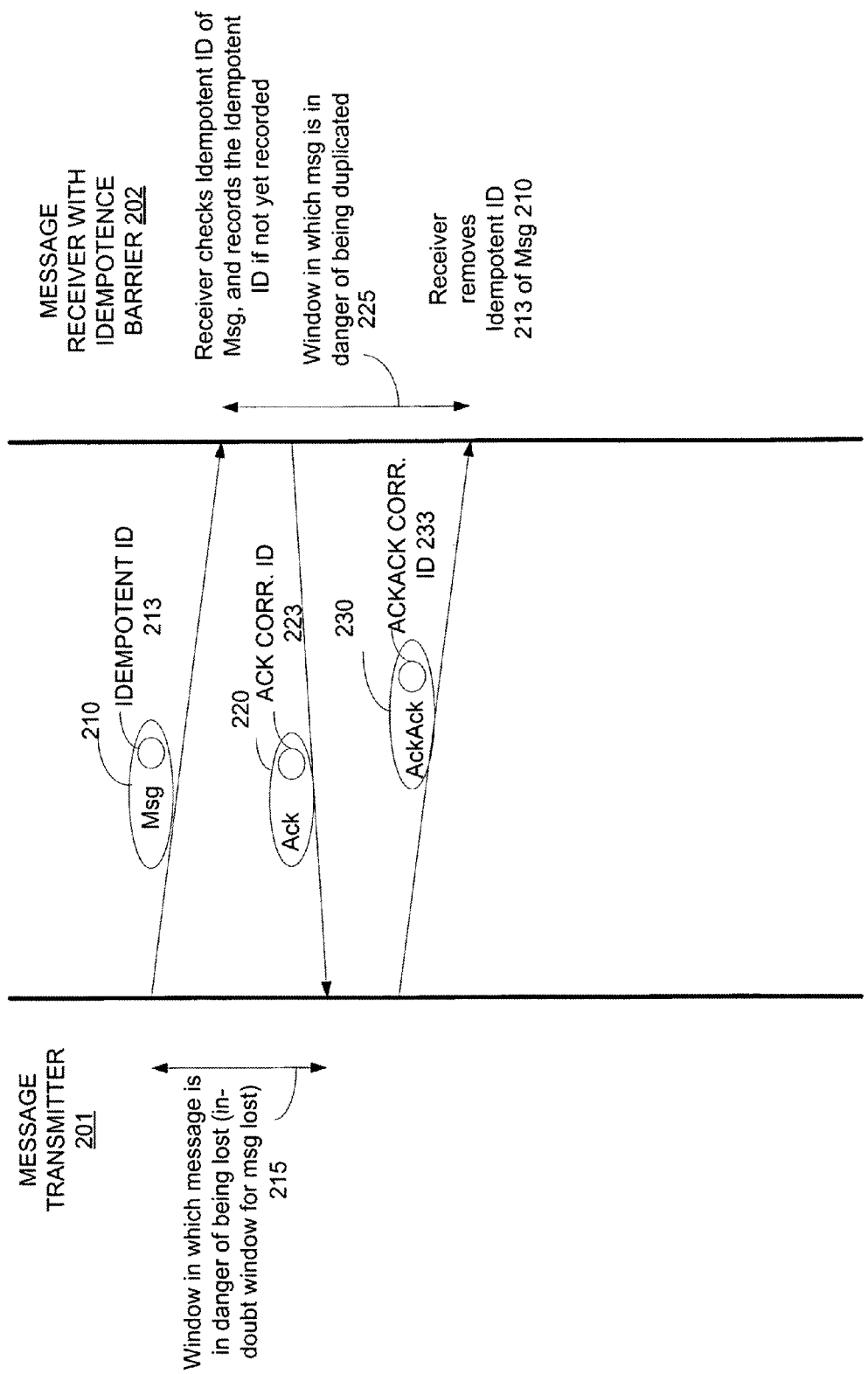
FIG. 2A illustrates a message flow diagram according to one embodiment of a three-way communication protocol.

FIG. 2A illustrates a message flow diagram according to one embodiment of a three-way communication protocol. Note that the technique disclosed herein is generally applicable to any type of protocols (e.g., Transmission Control Protocol (TCP), etc.), including both protocols with ordering and protocols without ordering. In the following discussion, one or more communication links have been established between a message transmitter 201 and a message receiver 202 with idempotent barrier. The message transmitter 201 and/or the message receiver 202 may be implemented on a computing device (e.g., a personal computer, a server, a laptop computer, etc.), a communication device (e.g., a cellular telephone, a personal digital assistant, etc.), and/or a networking device (e.g., a router, a switch, etc.), etc. An exemplary embodiment of a computing device is discussed in details below with reference to FIG. 4.

Initially, the message transmitter 201 sends a message 210 with an idempotent identification (ID) 213 to the message receiver 202. The message 210 may be all or part of an electronic mail, an attachment to an electronic mail, a transaction request (e.g., a request to transfer fund from a first financial account to a second financial account, a request to pay a bill using funds from a predetermined bank account, a request to purchase some predetermined merchandise and/or services, etc.), etc. The idempotent ID 213 is an identifier for detection of duplicate messages. Many schemes for generating unique IDs that meets the requirements of the particular applications may be used to generate the idempotent ID 213. For example, in some embodiments, the idempotent ID 213 includes a universal unique ID (UUID), a sequential ID, or a combination of both.

Upon receipt of the message 210, the message receiver 202 checks a set of previously recorded idempotent IDs to determine if there is a match with the idempotent ID 213. If there is a match, then the message receiver 202 determines that the message 210 is a duplicate message of a previously received message, and thus, discards the message 210. Otherwise, if there is no match, then the message receiver 202 determines that the message 210 is not a duplicate message, and thus, further processes the message 210 based on content of the message 210. For example, if the content of the message 210 includes a request to pay a bill using funds from a particular bank account, then the message receiver 202 may submit the request to a bill payment server to be processed accordingly. In another example, if the content of the message 210 is an electronic mail addressed to a predetermined email account, then the message receiver 202 may forward the message 210 to the predetermined email account. Furthermore, the message receiver 202 records the idempotent ID 213 by adding the idempotent ID 213 into the set of previously recorded idempotent IDs so that messages received later may be checked in substantially the same manner as discussed above.

Upon receipt of the message 210, the message receiver 202 sends an acknowledgement 220 to the message transmitter 201 to confirm receipt of the message 210 if the message 210. Note that the acknowledgement 220 is sent even if the message 210 is a duplicate in order to prevent a lost acknowledgement from causing the transmitter 201 to repeat the message 210 indefinitely. The acknowledgement 220 includes an Ack correlation ID 223, which is an ID usable by the message transmitter 201 to correlate the acknowledgement 220 with the message 210. For example, the Ack correlation ID 223 may be the same as the idempotent ID 213. Alternatively, the Ack correlation ID 223 may be different from the idempotent ID 213, but the message transmitter 201 may derive the idempotent ID 213 from the Ack correlation ID 223. In some embodiments, the message transmitter 201 may continue to send duplicates of the message 210 periodically to the message receiver 202 until the message transmitter 201 receives the acknowledgement 220 from the message receiver 202. In some embodiments, the duplicate of the message 210 contains the same idempotent ID 213 so that the message receiver 202 may rely on the idempotent ID 213 to check for duplicate messages.

The time window starting at the sending of the message 210 by the message transmitter 201 and ending at the receipt of the acknowledgement 220 at the message transmitter 201 is referred to as an in-doubt window 215. This is because the message 210 is in danger of being lost during the in-doubt window 215. The in-doubt window 215 ends at the receipt of the acknowledgement 220 at the message transmitter 201 because the message transmitter 201 is assured by the acknowledgement 220 that the message receiver 202 has successfully received the message 210 (i.e., the message 210 is not lost or corrupted during transmission).

Upon receipt of the acknowledgement 220, the message transmitter 201 generates a second acknowledgement 230 (also referred to as an "AckAck"). The second acknowledgement 230 may include an AckAck correlation ID 233 to allow the message receiver 202 to correlate the AckAck 230 with the idempotent ID 213 of the message 210. For example, the AckAck correlation ID 233 may be the same as the Ack correlation ID 223 or the idempotent ID 213. Then the message transmitter 201 sends the second acknowledgement 230 to the message receiver 202 to confirm receipt of the acknowledgement 220. In some embodiments, the message transmitter 201 also discontinues or stops sending duplicates of the message 210 to the message receiver 202 upon receipt of the first acknowledgement 220.

In response to receiving the second acknowledgement 230 from the message transmitter 201, the message receiver 202 is assured that the message transmitter 201 has discontinued sending duplicates of the message 210 to the message receiver 202. Therefore, the message receiver 202 will not receive any more duplicates of the message 210 from the message transmitter 201. As such, the message receiver 202 does not need to check if messages received are duplicates of the message 210 from now on, and hence, may remove, delete, or discard the idempotent ID 213 of the message 210 from the set of previously recorded idempotent IDs. In some embodiments, where the underlying network technology may cause variable delay for distinct transmissions, the message receiver 202 introduces a delay between receiving the second acknowledgement 230 and discarding the idempotent ID of the message 210. This is so because on such networks, a duplicate message might be delayed longer than the second acknowledgement 230, thereby permitting the second acknowledgement 230 to overtake the duplicate message. The duration of this delay is greater than the maximum differential delay that may be introduced by the network. Alternatively, the message transmitter 201 may introduce substantially the same delay between receiving the first acknowledgement 220 and transmitting the second acknowledgement 230.

The time window starting at the receipt of the message 210 by the message receiver 202 and ending at the receipt of the second acknowledgement 230 at the message receiver 202 is referred to as a possibly-duplicate window 225. This is because the message 210 is in danger of being duplicated during the possibly-duplicate window 225. Unlike the possibly-duplicate window 125 in FIG. 1 according to some conventional two-way communication protocols, which goes on indefinitely, the possibly-duplicate window 225 ends at the receipt of the second acknowledgement 230 at the message receiver 202 because the message receiver 202 is assured that the message transmitter 201 has successfully received the acknowledgement 220 for the message 210, and thus, has stopped sending duplicates of the message 210. Therefore, when a failure occurs, the window of possible duplicates is restricted to a finite time period, rather than going on indefinitely.

Note that in some embodiments, some protocols (such as TCP) use sequential ID because of the better compressibility of sequential ID. It should be appreciated that the compressibility of sequential ID is much better than UUID because sequential IDs are generated in sequence (e.g., 1, 2, 3, 4, etc.), and thus, the message receiver 202 may record only the first and the last sequential IDs without recording every sequential IDs of messages received. Moreover, a sequential ID is typically 4 to 8 bytes long, while a UUID is typically 16 bytes long. As such, performance of the message receiver 202 is improved by using sequential IDs as the idempotent ID 213. However, the message transmitter 201 may further embed a UUID in the message 210. The message receiver 202 may record both the sequential ID and the UUID, but may normally use only the sequential ID to determine if the message 210 is a duplicate message. When a long-term failure occurs between the message receiver 202 and the message transmitter 201, the sequential ID may no longer be valid. As such, the message receiver 202 may fall back onto the UUID to check for duplicate messages when communication between the message transmitter 201 and the message receiver 202 resumes or recovers after the long-term failure. In some embodiments, where there are multiple message transmitters, it becomes difficult to coordinate among the multiple message transmitters in order to generate sequential IDs for the messages. Thus, the message transmitters may use another type of ID, such as UUIDs, or transmitter scoped sequential IDs instead.

Figure 2B:
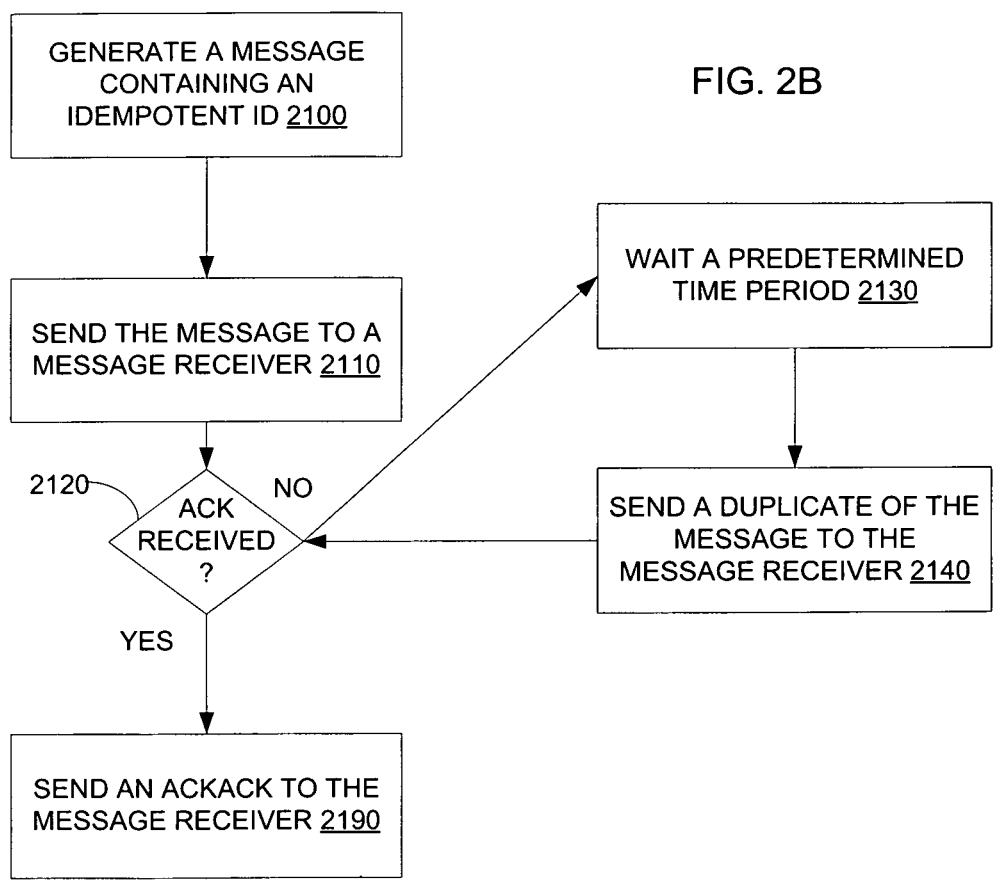
FIG. 2B illustrates a flow diagram of one embodiment of a process to send a message from a message transmitter to a message receiver.

FIG. 2B illustrates a flow diagram of one embodiment of a process to send a message from a message transmitter to a message receiver. The process may be performed by processing logic that may comprise hardware (e.g., circuitry, dedicated logic, programmable logic, microcode, etc.), software (such as instructions run on a processing device), firmware, or a combination thereof. For example, any one of the devices in the system 300 in FIG. 3B may perform at least part of the process in some embodiments.

Initially, processing logic generates a message containing an idempotent ID (processing block 2100). As discussed above, the idempotent ID may include a sequential ID and/or a UUID. Then processing logic sends the message to a message receiver (processing block 2110). After sending the message, processing logic checks if an acknowledgement of the message is received (processing block 2120). If not, processing logic may wait a predetermined time period (processing block 2130). Then processing logic may send a duplicate of the message to the message receiver (processing block 2140). Then processing logic returns to processing block 2120 again to check if an acknowledgement is received. As such, processing logic may resend the message periodically until an acknowledgement is received.

When processing logic determines that an acknowledgement for the message has been received at processing block 2120, processing logic sends an AckAck to the message receiver to acknowledge receipt of the acknowledgement from the message receiver (processing block 2190). As such, processing logic stops re-sending duplicates of the message to the message receiver.

Figures 2C, 2D:
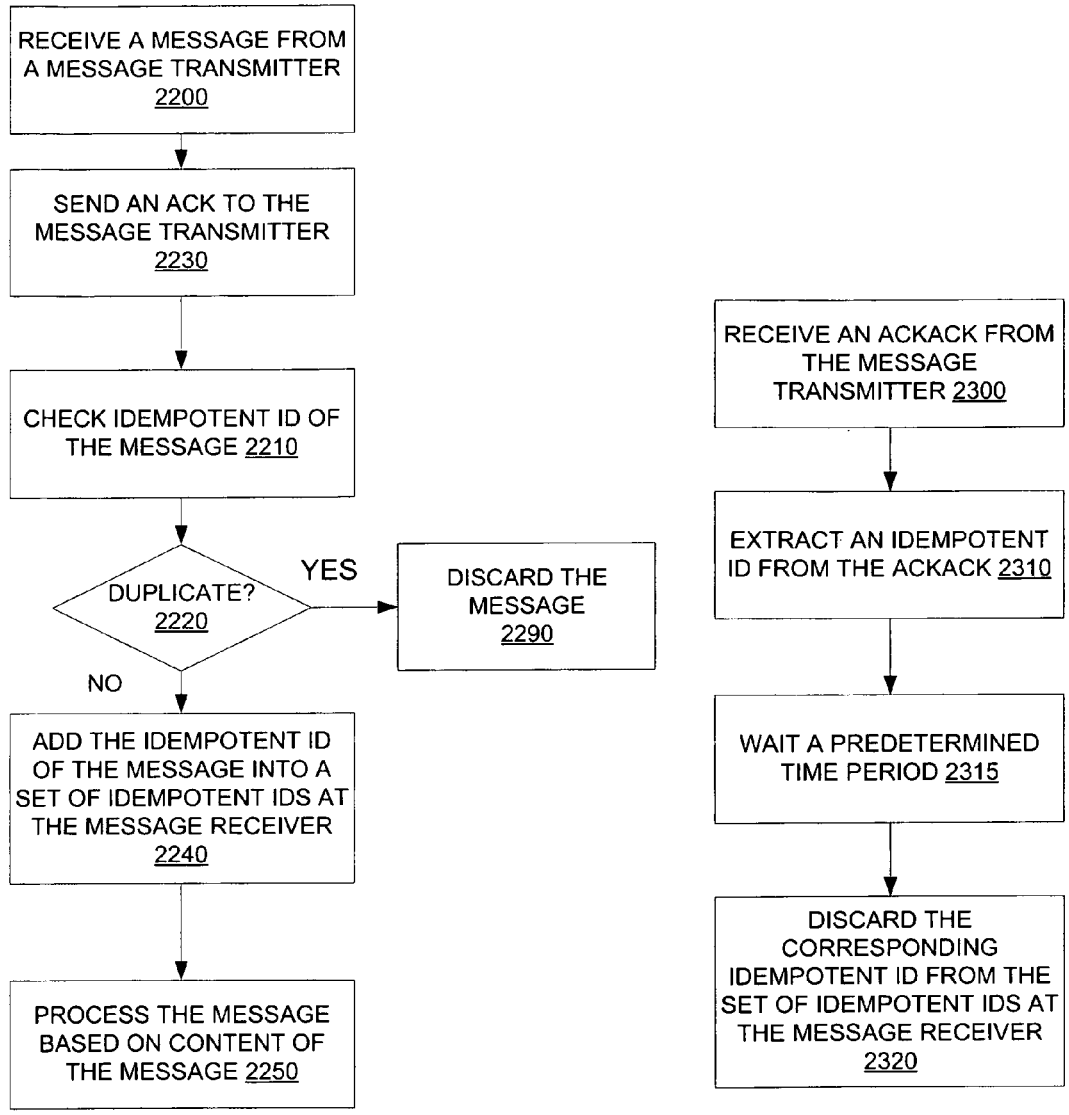
FIG. 2C illustrates a flow diagram of one embodiment of a process to handle a message received from a message transmitter at a message receiver.
FIG. 2D illustrates a flow diagram of one embodiment of a process to handle an AckAck received from a message transmitter at a message receiver.

FIG. 2C illustrates a flow diagram of one embodiment of a process to handle a message received from a message transmitter at a message receiver. The process may be performed by processing logic that may comprise hardware (e.g., circuitry, dedicated logic, programmable logic, microcode, etc.), software (such as instructions run on a processing device), firmware, or a combination thereof. For example, any one of the devices in the system 300 in FIG. 3B may perform at least part of the process in some embodiments.

Processing logic receives a message from the message transmitter at the message receiver (processing block 2200). Processing logic sends an acknowledgement to the message transmitter to acknowledge receipt of the message (processing block 2230). Processing logic checks an idempotent ID of the message (processing block 2210). Using the idempotent ID, processing logic determines if the message is a duplicate of a previously received message (processing block 2220). If the message is a duplicate, then processing logic discards the message to avoid processing the same message twice (processing block 2290). If the message is not a duplicate, then processing logic transitions to processing block 2240 to further process the message.

Processing logic further adds the idempotent ID of the message into a set of idempotent IDs of some previously received messages at the message receiver (processing block 2240). Then processing logic processes the message based on content of the message (processing block 2250). Details of some examples of message processing based on the content of the message have been discussed above.

FIG. 2D illustrates a flow diagram of one embodiment of a process to handle an AckAck received from a message transmitter at a message receiver. The process may be performed by processing logic that may comprise hardware (e.g., circuitry, dedicated logic, programmable logic, microcode, etc.), software (such as instructions run on a processing device), firmware, or a combination thereof. For example, any one of the devices in the system 300 in FIG. 3B may perform at least part of the process in some embodiments.

Referring to FIG. 2D, processing logic at the message receiver receives an AckAck from the message transmitter, acknowledging receipt of a message acknowledgement from the message receiver (processing block 2300). Then processing logic extracts an idempotent ID from the AckAck (processing block 2310). The idempotent ID corresponds to an idempotent ID of the message previously received at the message receiver. Processing logic waits a predetermined time period (processing block 2315). The predetermined time period may be computed as discussed above. Then processing logic discard the corresponding idempotent ID from a set of idempotent IDs previously recorded or stored at the message receiver (processing block 2320).

Figure 3A:
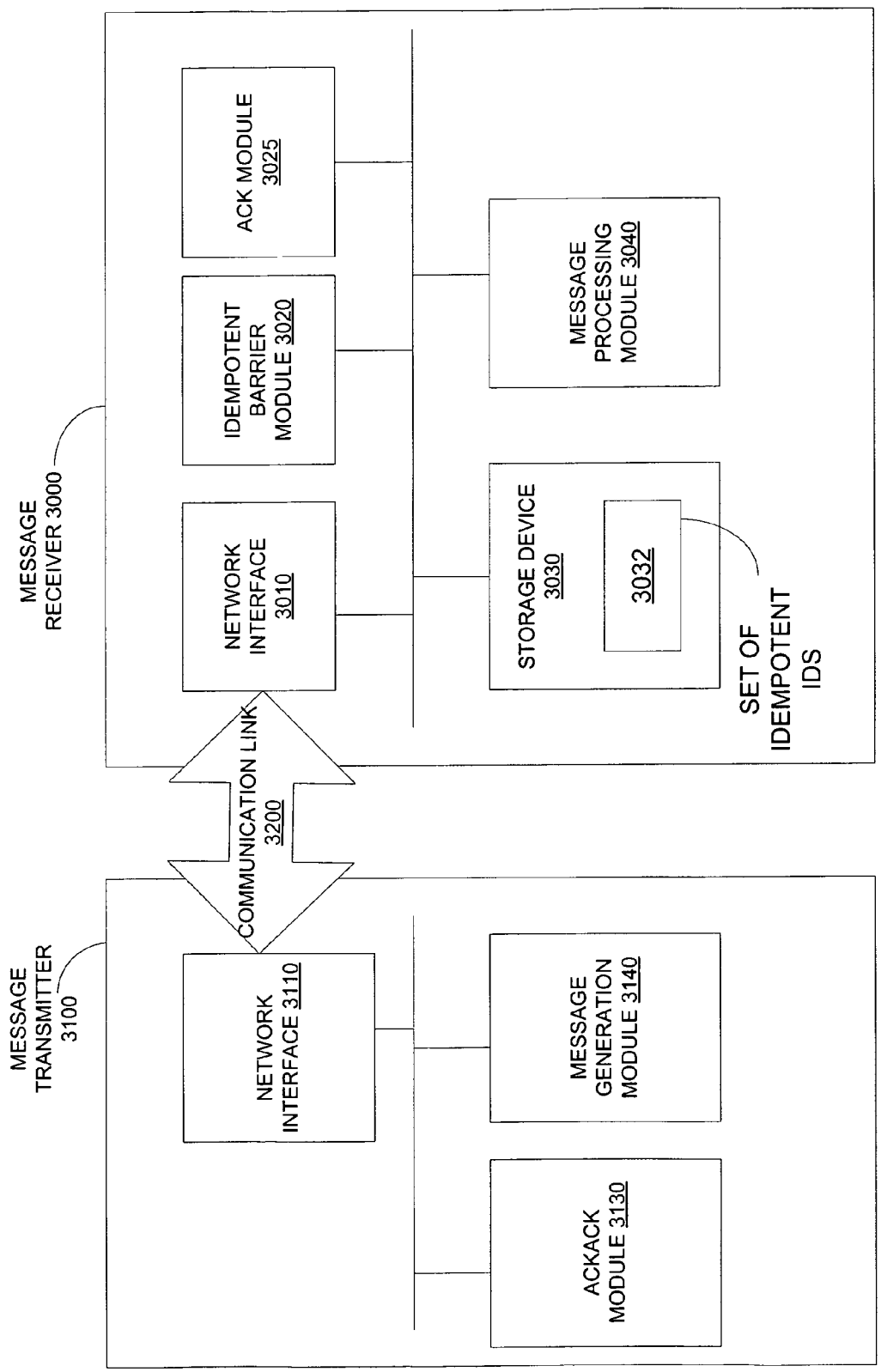
FIG. 3A illustrates a block diagram of one embodiment of a message transmitter and one embodiment of a message receiver.

FIG. 3A illustrates a functional block diagram of one embodiment of a message transmitter and one embodiment of a message receiver. As discussed above, the message transmitter 3100 and/or the message receiver 3000 may be implemented on a computing device (e.g., a personal computer, a server, a laptop computer, etc.), a communication device (e.g., a cellular telephone, a personal digital assistant, etc.), and/or a networking device (e.g., a router, a switch, etc.), etc.

In some embodiments, the message transmitter 3100 includes a network interface 3110, an AckAck module 3130, and a message generation module 3140. The message generation module 3140 generates messages, which may be all or part of an electronic mail, an attachment to an electronic mail, a transaction request, etc. The message generation module 3140 may add an idempotent ID to each message generated to allow the message receiver 3000 to detect duplicate messages. The idempotent ID may include a sequential ID and/or a UUID. The message generation module 3140 forwards messages generated to the network interface 3110, which is communicatively coupled to a communication link 3200. Via the communication link 3200, the network interface 3110 sends the messages to the message receiver 3000. The communication link 3200 may include wired and/or wireless connections and adopt various types of protocols (e.g., TCP, etc.).

In some embodiments, the message receiver 3000 includes a network interface 3010, an idempotent barrier module 3020, an acknowledgement module 3025, a storage device 3030, and a message processing module 3040. When the network interface 3010 receives a message via the communication link 3200 from the message transmitter 3100, the network interface 3010 forwards the message to the idempotent barrier module 3020, which compares an idempotent ID of the message against a set of idempotent IDs 3032 of previously received messages. The set of idempotent IDs 3032 may be stored in the storage device 3030. If the idempotent ID of the message matches one of the set of idempotent IDs 3032, then the idempotent barrier module 3020 determines that the message is a duplicate message, and thus, discards the message and/or prevents the message from being further processed. Otherwise, the idempotent barrier module 3020 forwards the message to the message processing module 3040 to be further processed. The message processing module 3040 may further process the message based on content of the message. Some examples of processing the message based on its content have been discussed above.

In addition, the acknowledgement module 3025 sends an acknowledgement via the network interface 3010 and the communication link 3200 to the message transmitter 3100. Upon receipt of the acknowledgement, the AckAck module 3130 of the message transmitter 3100 sends a second acknowledgement (also referred to as an AckAck) via the communication link 3200 to the message transmitter 3000, and the message generation module 3040 stops generating duplicate messages of the message to be periodically sent to the message receiver 3000. The second acknowledgement may contain the idempotent ID of the message.

When the network interface 3010 of the message receiver 3000 receives the second acknowledgement from the message transmitter 3100, the message receiver 3000 is assured that the message transmitter 3100 has received the first acknowledgement from the message receiver 3000, and thus, has stopped sending duplicates of the message to the message receiver 3000. Therefore, the message receiver 300 no longer needs the idempotent ID of the message to detect duplicates of the message. The idempotent barrier module 3020 may wait a predetermined time period and then delete the corresponding idempotent ID from the set of idempotent IDs 3032. Details on how the predetermined time period may be computed have been discussed above.

Figure 3B:
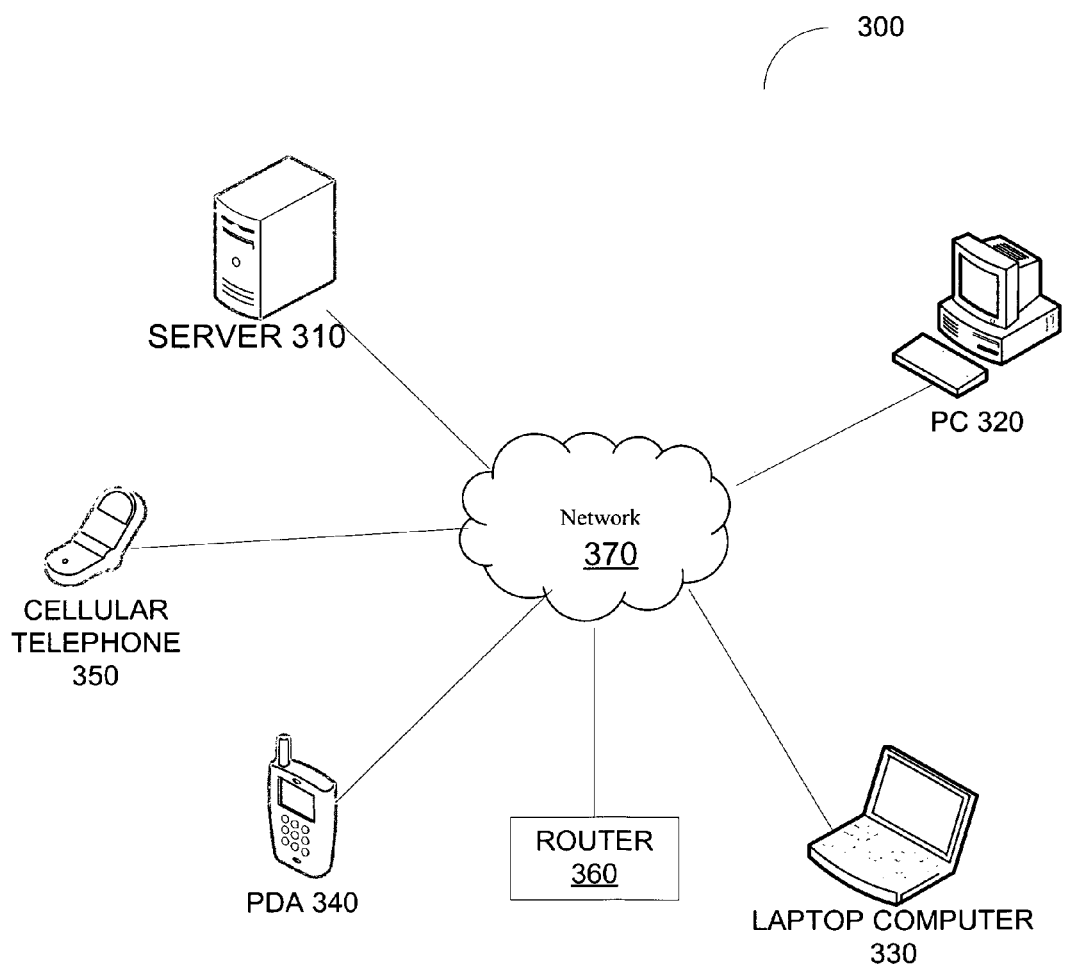
FIG. 3B illustrates one embodiment of a system in which embodiments of the present invention may be implemented.

FIG. 3B illustrates one embodiment of a system in which embodiments of the present invention may be implemented. The system 300 includes a server 310, a personal computer (PC) 320, a laptop computer 330, a personal digital assistant 340, a cellular telephone 350, a router 360, which are communicatively coupled to each other via a network 370. The network 370 may include wired and/or wireless connections, secured and/or non-secured connections, local area network (LAN), wide area network (WAN), etc.

Note that any or all of the devices of the system 300 and associated hardware may be used in various embodiments of the present invention. However, it can be appreciated that other configurations of the system 300 may include more or fewer devices than those discussed above. The devices in the system 300 may communicate with each other using some embodiments of the three-way communication protocol to improve reliability of their communication. Details of some embodiments of the three-way communication protocol have been described above.

Figure 4:
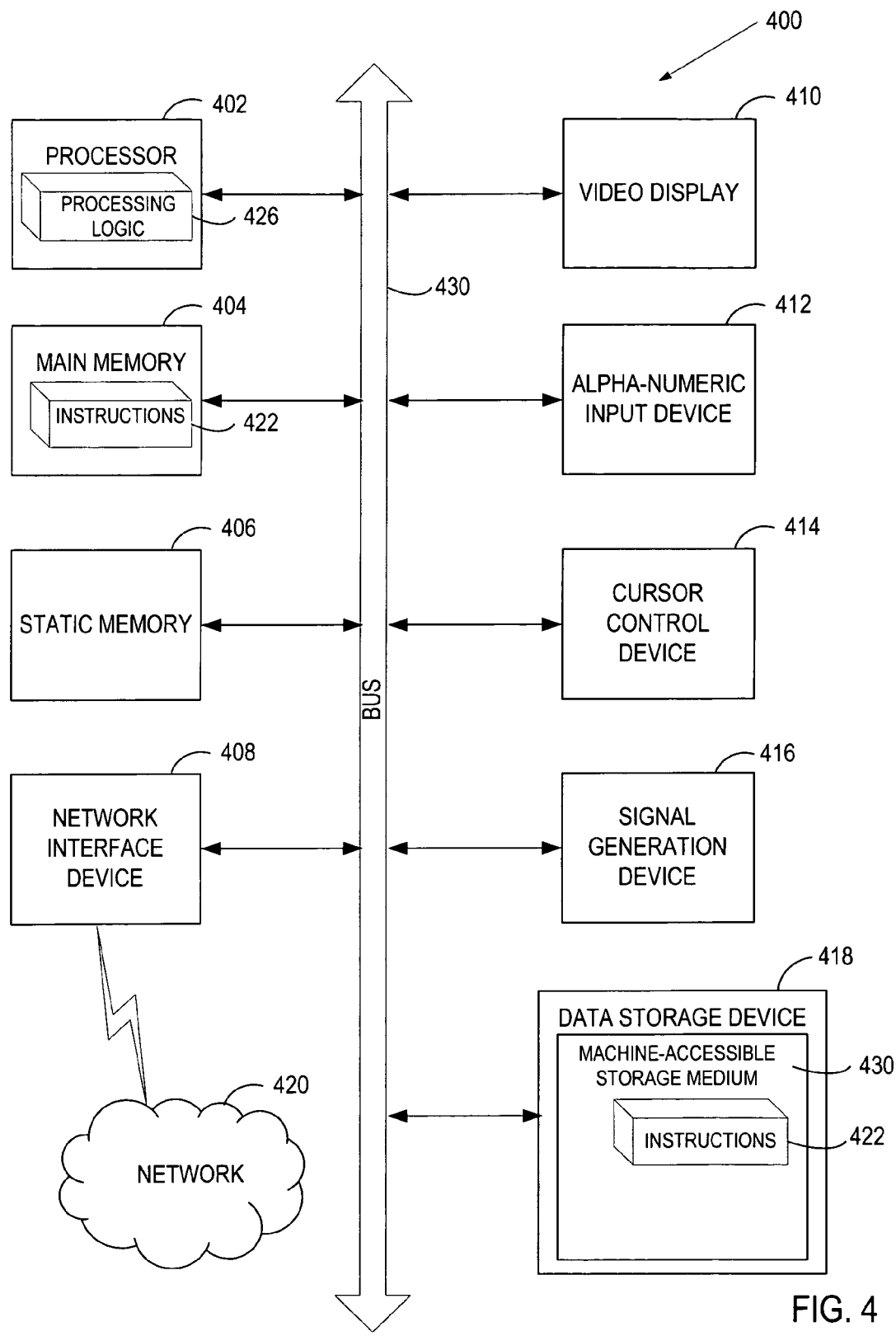
FIG. 4 illustrates a block diagram of an exemplary computer system.

FIG. 4 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 (also referred to as a computer-readable storage medium) is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of a three-way communication protocol have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
receiving, by a processing device of a message receiver, a message from a message transmitter, the message comprising an idempotent identification (ID);
sending, by the processing device, a first acknowledgement of the message to the message transmitter in response to receipt of the message;
determining, by the processing device, whether the message receiver has previously received the message from the message transmitter in view of the idempotent ID;
in response to determining that the message was previously received, discarding the message;
recording, by the processing device, the idempotent ID;
receiving, by the processing device, a second acknowledgement from the message transmitter comprising the idempotent ID that acknowledges the message transmitter's receipt of the first acknowledgement; and
in response to receipt of the second acknowledgement, by the processing device, discarding the idempotent ID after a determined period of time.

2. The method of claim 1,
wherein determining whether the message receiver has previously received the message comprises checking the idempotent ID of the message against a set of idempotent IDs recorded at the message receiver, and
wherein recording the idempotent ID comprises processing the message in view of content of the message and adding the idempotent ID of the message to the set of idempotent IDs if the idempotent ID matches none of the set of idempotent IDs recorded at the message receiver.

3. The method of claim 1, wherein the message comprises an electronic mail.

4. The method of claim 1, wherein the message comprises a transaction request.

5. The method of claim 1, wherein the idempotent ID comprises a universal unique ID (UUID).

6. An apparatus comprising:
a memory; and
a processing device coupled to the memory to:
receive a message from a message transmitter, the message comprising an idempotent identification (ID);
send a first acknowledgement of the message to the message transmitter in response to receipt of the message;
determine whether the message receiver has previously received the message from the message transmitter in view of the idempotent ID;
in response to determining that the message was previously received, discard the message;
record the idempotent ID;
receive a second acknowledgement from the message transmitter comprising the idempotent ID that acknowledges the message transmitter's receipt of the first acknowledgement; and
in response to receipt of the second acknowledgement, discard the idempotent ID after a determined period of time.

7. The apparatus of claim 6,
wherein to determine whether the message receiver has previously received the message, the processing device is further to check the idempotent ID of the message against a set of idempotent IDs recorded at the message receiver, and wherein to record the idempotent ID, the processing device is further to process the message in view of content of the message and add the idempotent ID of the message to the set of idempotent IDs if the idempotent ID matches none of the set of idempotent IDs recorded at the message receiver.

8. The apparatus of claim 6, wherein the message comprises an electronic mail.

9. The apparatus of claim 6, wherein the message comprises a transaction request.

10. The apparatus of claim 6, wherein the idempotent ID comprises a universal unique ID (UUID).

11. A system comprising the apparatus of claim 6, further comprising:
   the message transmitter; and
   a network coupled between a message transmitter and the apparatus.

12. A non-transitory computer-readable storage medium that provides instructions that cause a processing device to perform operations comprising:
   receiving, by the processing device of a message receiver, a message from a message transmitter, the message comprising an idempotent identification (ID);
   sending, by the processing device, a first acknowledgement of the message to the message transmitter in response to receipt of the message;
   determining, by the processing device, whether the message receiver has previously received the message from the message transmitter in view of the idempotent ID;
   in response to determining that the message was previously received, discarding the message;
   recording, by the processing device, the idempotent ID;
   receiving a second acknowledgement from the message transmitter comprising the idempotent ID acknowledging the message transmitter's receipt of the first acknowledgement; and
   in response to receipt of the second acknowledgement, discarding, by the processing device, the idempotent ID after a determined period of time.

13. The non-transitory computer-readable storage medium of claim 12,
   wherein determining whether the message receiver has previously received the message comprises checking the idempotent ID of the message against a set of idempotent IDs recorded at the message receiver, and
   wherein recording the idempotent ID comprises processing the message in view of content of the message and adding the idempotent ID of the message to the set of idempotent IDs if the idempotent ID matches none of the set of idempotent IDS recorded at the message receiver.

14. The non-transitory computer-readable storage medium of claim 12, wherein the message comprises an electronic mail.

15. The non-transitory computer-readable storage medium of claim 12, wherein the message comprises a transaction request.

16. The non-transitory computer-readable storage medium of claim 12, wherein the idempotent ID comprises a universal unique ID (UUID).

* * * * *